United States Patent
Li et al.

(10) Patent No.: US 12,449,154 B2
(45) Date of Patent: Oct. 21, 2025

(54) AUTOMATIC CHANGEOVER CONTROL OF A FAN COIL UNIT OF A BUILDING

(71) Applicant: Honeywell International Inc., Charlotte, NC (US)

(72) Inventors: You Yu Li, Charlotte, NC (US); Jun Jie Zhang, Charlotte, NC (US); Yi Zhang, Charlotte, NC (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 168 days.

(21) Appl. No.: 18/550,066

(22) PCT Filed: Mar. 16, 2021

(86) PCT No.: PCT/CN2021/080921
§ 371 (c)(1),
(2) Date: Sep. 11, 2023

(87) PCT Pub. No.: WO2022/193109
PCT Pub. Date: Sep. 22, 2022

(65) Prior Publication Data
US 2024/0151423 A1    May 9, 2024

(51) Int. Cl.
*F24F 11/67* (2018.01)
*F24F 11/64* (2018.01)
(Continued)

(52) U.S. Cl.
CPC .............. *F24F 11/67* (2018.01); *F24F 11/64* (2018.01); *F24F 11/84* (2018.01); *F24F 11/89* (2018.01); *F24F 2110/10* (2018.01)

(58) Field of Classification Search
CPC .. F24F 11/67; F24F 11/84; F24F 11/64; F24F 11/89; F24F 11/56; F24F 11/77; F24F 2110/10
See application file for complete search history.

(56) References Cited

U.S. PATENT DOCUMENTS 5,560,422 A * 10/1996 Matumoto ............. F24F 11/871
62/158
6,102,749 A    8/2000 Lynn et al.
(Continued)

FOREIGN PATENT DOCUMENTS

CA       3039300 A1    10/2019
CN     101245938 A     8/2008
(Continued)

OTHER PUBLICATIONS

Extended European Search Report, EP Application No. 21930705.5, European Patent Office, Nov. 4, 2024 (11 pages).

*Primary Examiner* — Marc E Norman
(74) *Attorney, Agent, or Firm* — Seager, Tufte & Wickhem, LLP

(57) ABSTRACT

Systems and methods of operating a two-pipe fan coil unit include, controlling the flow control valve and the fan using a controller, wherein the controller includes a heating control mode and a cooling control mode. The controller changes a position of the flow control valve from a first position to a second position, activates the fan to blow air across the heat exchanger coil and into the space of the building, and monitors a space temperature of the space. When the space temperature is determined to be increasing, the controller may determine that the building is in the building heating mode and sets the controller to the heating control mode, and when the space temperature is determined to be decreasing, the controller may determine that the building is in the building cooling mode and sets the controller to the cooling control mode.

20 Claims, 9 Drawing Sheets

(51) Int. Cl.
*F24F 11/84* (2018.01)
*F24F 11/89* (2018.01)
*F24F 110/10* (2018.01)

(56) References Cited

U.S. PATENT DOCUMENTS

| | | | |
|---|---|---|---|
| 6,109,044 A * | 8/2000 | Porter | F28D 15/0266 62/96 |
| 9,157,646 B2 * | 10/2015 | Anderson | F24F 11/30 |
| 9,244,469 B2 | 1/2016 | Vaughn et al. | |
| 10,190,788 B2 | 1/2019 | Schnell et al. | |
| 10,268,219 B1 | 4/2019 | Haynold | |
| 10,670,288 B2 | 6/2020 | Thomle et al. | |
| 2005/0229615 A1 | 10/2005 | Nakamura | |
| 2012/0061068 A1 | 3/2012 | Anderson et al. | |
| 2017/0089604 A1 | 3/2017 | Sullivan et al. | |

FOREIGN PATENT DOCUMENTS

| | | |
|---|---|---|
| CN | 108800416 A | 11/2018 |
| CN | 110207344 A | 9/2019 |
| CN | 110657549 A | 1/2020 |
| CN | 111271826 A | 6/2020 |
| CN | 210892053 U | 6/2020 |
| JP | 61240052 A * | 10/1986 |

* cited by examiner

AUTOMATIC CHANGEOVER CONTROL OF A FAN COIL UNIT OF A BUILDING

TECHNICAL FIELD

The present disclosure relates generally to building control systems. More particularly, the present disclosure relates to automatic changeover control of a fan coil unit.

BACKGROUND

A variety of buildings such as hotels, apartment buildings, and the like are heated and cooled using Fan Coil Units (FCU). In an FCU, a heat transfer fluid such as water is pumped or otherwise forced through a fan coil of the FCU. A fan of the FCU is used to blow air across the fan coil and into the building space. The heat transfer fluid is heated during a heating season and cooled during a cooling season. In some cases, the heat transfer fluid may be heated by a heating element such as a boiler, and may be cooled by a cooling element such as an evaporator. Typically, maintenance personnel of the building switch the building between a building heating mode to a building cooling mode depending on the season. During the heating season, the heat transfer fluid is heated, and during the cooling season, the heat transfer fluid is cooled.

Typically, the FCU is controlled by an FCU controller, such as a thermostat located in the building space. The FCU controller typically senses a temperature in the building space and sends control signals to the FCU to maintain the temperature in the building space in accordance with a corresponding set point temperature. The FCU controller typically regulates the temperature in the building space by controlling the fan of the FCU, along with a flow control valve that regulates the flow of heat transfer fluid through the fan coil of the FCU.

During the heating season, the heat transfer fluid is heated. When the temperature in the space drops below a heat set point temperature, the FCU controller in a heating control mode typically opens the flow control valve and turns on the fan of the FCU. This causes heated air to be blown into the building space. Once the temperature in the space rises above the heat set point temperature, the FCU controller typically closes the flow control valve and turns off the fan of the FCU. In some cases, the position of the flow control valve is not closed all the way but rather is regulated to provide sufficient heat to the fan coil of the FCU to match the heat loss from the building space, and the fan remains on to blow the heated air into the building space.

During the cooling season, the heat transfer fluid is cooled. When the temperature in the space rises above a cool set point temperature, the FCU controller in a cooling control mode typically opens the flow control valve and turns on the fan of the FCU. This causes cooled air to be blown into the building space. Once the temperature in the space falls below the cool set point temperature, the FCU controller typically closes the flow control valve and turns off the fan of the FCU. In some cases, the position of the flow control valve is not closed all the way but rather is regulated to provide sufficient cooling to the fan coil of the FCU to match the heat gain of the building space, and the fan remains on to blow the cooled air into the building space.

As can be seen, when in the heating control mode, the FCU controller opens the flow control valve to increase the temperature in the building space, and when in the cooling control mode, the FCU controller opens the flow control valve to decrease the temperature in the building space. Thus, the FCU must know whether the building is in the building heating mode or the building cooling mode to properly control the FCU. In some cases, the FCU controller is operatively coupled to a changeover temperature sensor that is thermally coupled to a pipe supplying the heat transfer fluid to the FCU. The changeover temperature sensor can sense whether the heat transfer fluid has been heated or cooled. When the heat transfer fluid is heated, the FCU controller determines that the building is currently in the building heating mode and controls the FCU flow control valve accordingly. Likewise, when the heat transfer fluid is cooled, the FCU controller determines that the building is currently in the building cooling mode and controls the FCU flow control valve accordingly. This arrangement provides an automatic changeover function for the FCU controller, where the FCU controller automatically changes between a heating control mode and a cooling control mode as the building switch between a building heating mode and a building cooling mode.

In this arrangement, a changeover temperature sensor must be installed and operatively coupled to the FCU controller. What would be desirable is a method and system that allows the FCU controller to perform the automatic changeover function without having to add a changeover temperature sensor.

SUMMARY

The present disclosure relates generally to building control systems. More particularly, the present disclosure relates to automatic changeover control of a fan coil unit. In one example, a two-pipe FCU may be configured to control a temperature within a space of a building. The FCU may have a heat exchanger coil that receives a fluid from a supply pipe and may return a return fluid to a return pipe. The FCU may further include a fan for flowing air across the heat exchanger coil and into the space of the building. A flow of supply fluid through the heat exchanger coil is controlled by a flow control valve. The supply fluid may be heated when the building is in the building heating mode, and the supply fluid may be cooled when the building is in the building cooling mode.

An illustrative method of operating the FCU may include controlling the flow control valve and the fan using a controller, wherein the controller may have a heating control mode and a cooling control mode. The controller may change a position of the flow control valve from a first position to a second position, wherein the second position is more open than the first position. The controller may activate the fan to blow air across the heat exchanger coil and into the space of the building, and may monitor a space temperature of the space. After the position of the flow control valve has been changed to a more open position and the fan has been activated, it is determined whether the space temperature is increasing or decreasing as a result. When the space temperature is determined to be increasing, the controller determines that the building is in the building heating mode and sets the controller to the heating control mode. When the space temperature is determined to be decreasing, the controller determines that the building is in the building cooling mode and sets the controller to the cooling control mode.

When the controller is in the heating control mode, the controller may compare the space temperature to a heating temperature setpoint, and may open the flow control valve when the space temperature is below the heating temperature setpoint to raise the space temperature toward the heating temperature setpoint, and when the controller is in the cooling control mode, the controller may compare the space temperature to a cooling temperature setpoint, and open the flow control valve when the space temperature is above the cooling temperature setpoint to lower the space temperature toward the cooling temperature setpoint.

In another example, a method of operating a two-pipe FCU configured to control a space temperature within a space in a building may include running control logic to open a valve that controls a supply fluid to a heat exchanger of the FCU for at least a set period of time, running control logic that activates a fan of the FCU that blows air across the heat exchanger of the FCU and into the space of the building during the set period of time, running control logic that monitors the space temperature in the space in the building during the set period of time, running control logic that identifies whether the space temperature has increased or decrease, wherein when the space temperature has increased by at least a first predefined amount, switching a control mode of the FCU to a heating mode and when the space temperature has decreased by at least a second predefined amount, switching the control mode of the FCU to a cooling mode. The method may include identifying a heating mode set-point temperature and a cooling mode set-point temperature, wherein when the control mode of the FCU is in the heating mode, controlling the valve and the fan of the FCU to maintain the heating mode set-point temperature in the space, and when the control mode of the FCU is in the cooling mode, controlling the valve and the fan of the FCU to maintain the cooling mode set-point temperature in the space.

In another example, a thermostat may be configured to control a temperature in a space in a building. The thermostat may include an output for controlling a valve of a fan coil unit (FCU) and a fan of the FCU, a temperature sensor for sensing a temperature in the space of the building, and a controller that is operatively coupled to the output and the temperature sensor. The controller has a plurality of control modes including a cooling control mode and a heating control mode. The controller may be configured to: provide an output via the output for opening the valve and activating the fan of the FCU for a set period of time, monitor the temperature of the space via the temperature sensor during the set period of time, and identify whether the temperature in the space of the building is increasing or decreasing. When the temperature in the space has increased by at least a first predefined amount during the set period of time, the thermostat may set the control mode of the thermostat to the heating control mode. When the temperature in the space has decreased by at least a second predefined amount during the set period of time, the thermostat may set the control mode of the thermostat to the cooling control mode. The controller may then control the FCU in accordance with the set control mode of the thermostat.

The preceding summary is provided to facilitate an understanding of some of the innovative features unique to the present disclosure and is not intended to be a full description. A full appreciation of the disclosure can be gained by taking the entire specification, claims, figures, and abstract as a whole.

BRIEF DESCRIPTION OF THE FIGURES

The disclosure may be more completely understood in consideration of the following description of various examples in connection with the accompanying drawings, in which.

Figure 1:
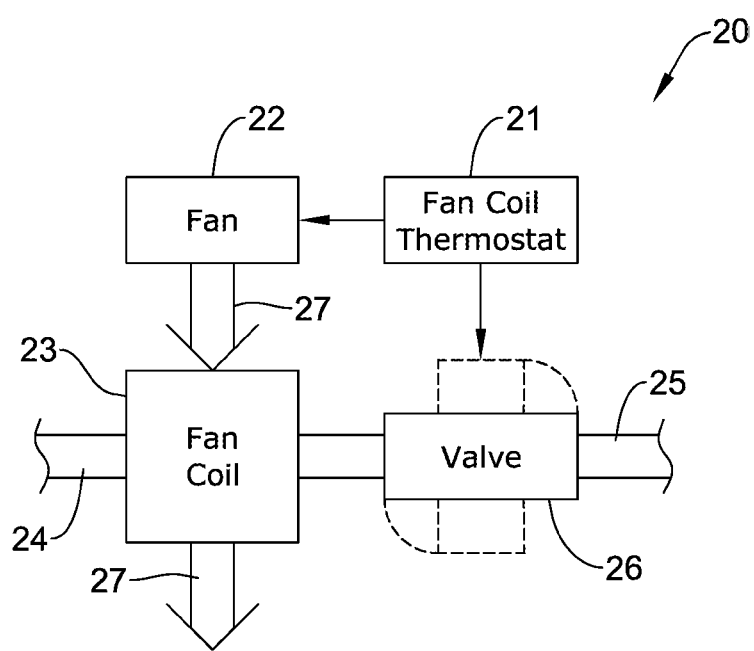
FIG. 1 is a schematic view of an illustrative fan coil unit.

While the disclosure is amenable to various modifications and alternative forms, specifics thereof have been shown by way of example in the drawings and will be described in detail. It should be understood, however, that the intention is not to limit the disclosure to the particular examples described. On the contrary, the intention is to cover all modifications, equivalents, and alternatives falling within the spirit and scope of the disclosure.

DESCRIPTION

The following description should be read with reference to the drawings, in which like elements in different drawings are numbered in like fashion. The drawings, which are not necessarily to scale, depict examples that are not intended to limit the scope of the disclosure. Although examples are illustrated for the various elements, those skilled in the art will recognize that many of the examples provided have suitable alternatives that may be utilized.

The present disclosure relates generally to building control systems. More particularly, the present disclosure relates to automatic changeover control of an FCU. FIG. 1 is a schematic view of an illustrative FCU 20. In a FCU, a heat transfer fluid such as water is delivered to fan coil 23 of the FCU 20, such as through a supply pipe 24 and return pipe 25. The fan coil 23 acts as a heat exchanger. A fan 22 of the FCU 20 is used to force air 27, across the fan coil 23 and out an outlet 27 to the building space.

The heat transfer fluid is heated during a heating season and cooled during a cooling season. In some cases, the heat transfer fluid may be heated by a heating element (not shown) such as a boiler, and may be cooled by a cooling element (not shown) such as an evaporator. Typically, maintenance personnel of the building switch the building between a building heating mode to a building cooling mode depending on the season. During the heating season, the heat transfer fluid is heated, and during the cooling season, the heat transfer fluid is cooled.

In the example shown, the FCU 20 is controlled by an FCU controller 21, such as a Fan Coil Thermostat located in the building space to be controlled. The FCU controller 21 typically senses a temperature in the building space and sends control signals to the FCU 20 to maintain the temperature in the building space in accordance with a corresponding set point temperature. The FCU controller 21 typically regulates the temperature in the building space by controlling the fan 22 of the FCU 20, along with a flow control valve 26 that regulates the flow of heat transfer fluid through the fan coil 23 of the FCU 20.

During the heating season, the heat transfer fluid is heated by heating element of the building (not shown), such as a boiler or the like. When the temperature in the space drops below a heat set point temperature, the FCU controller 21 in a heating control mode opens the flow control valve 26 and turns on the fan 22 of the FCU 20. This causes heated air to be blown into the building space via outlet 27. Once the temperature in the space rises to or above the heat set point temperature, the FCU controller 21 closes the flow control valve and turns off the fan 22 of the FCU 20. In some cases, the position of the flow control valve 26 is not closed all the way but rather is regulated to provide sufficient heat to the fan coil 23 of the FCU 20 to match the heat loss from the building space, and the fan 22 remains on to blow the heated air into the building space via the outlet 27.

During the cooling season, the heat transfer fluid is cooled by a cooling element of the building (not shown), such as an evaporator or the like. When the temperature in the space rises to or above a cool set point temperature, the FCU controller 21 in a cooling control mode opens the flow control valve 26 and turns on the fan 22 of the FCU 20. This causes cooled air to be blown into the building space via outlet 27. Once the temperature in the space falls below the cool set point temperature, the FCU controller 21 closes the flow control valve 26 and turns off the fan 22 of the FCU 20. In some cases, the position of the flow control valve 26 is not closed all the way but rather is regulated to provide sufficient cooling to the fan coil 23 of the FCU 20 to match the heat gain of the building space, and the fan 22 remains on to blow the cooled air into the building space via the outlet 27.

In one example, the FCU 20 is a two-pipe FCU that includes a first pipe (e.g. supply pipe) 24 for delivering a heat transfer fluid to the fan coil 23 of the FCU 20 and a second pipe 25 (e.g. return pipe) for returning the heat transfer fluid back to be reheated and/or cooled by a heating or cooling element of the building. During the heating season, the supply line 24 may provide a source of heated fluid (such as water) from a suitable source such as a boiler or water heater, geothermal, or the like. During the cooling season, the supply line 24 may provide a source of cooled fluid (such as water) from a suitable source such as an evaporative cooling tower or the like.

While the illustrative FCU 20 is schematically shown as a two-pipe fan coil system including a single supply line 24 and a single return line 25, it will be appreciated that the FCU 20 may by any suitable FCU. For example, the FCU may be a four-pipe system having heated water supply and return lines and cooling water supply and return lines. In some cases, a four-pipe system may include a single fan coil while in other cases, a four-pipe system may include two fan coils, with one dedicated to heated and one dedicated to cooling. In a two-pipe fan coil system, the single supply line may, for example, provide heated water during the heating season and may provide cooled water during the cooling season.

The valve 26 may provide binary (e.g., on/off) control while in other cases the valve 26 may be configured to provide a plurality of flow rates to the fan coil 23. In some cases, a first position of the valve 26 may correspond to a closed position, wherein a fluid flow does not flow at all through the fan coil 23. In some cases, the first position may not be a fully closed position, but rather may be open ten percent, twenty percent, seventy-five percent, or any suitable amount, as desired. The valve 26 may be moved between the first position and a second position. The second position may correspond to a position that is more open than the first position. For example, when the first position is a fully closed position, the second position may be open ten percent, twenty percent, seventy-five percent, or any suitable amount, as desired. In another example, when the first position is open ten percent, the second position may be open twelve percent, twenty percent, seventy-five percent one hundred percent, or any suitable amount, as desired. These are just examples, and are not meant to be limiting.

Figure 2:
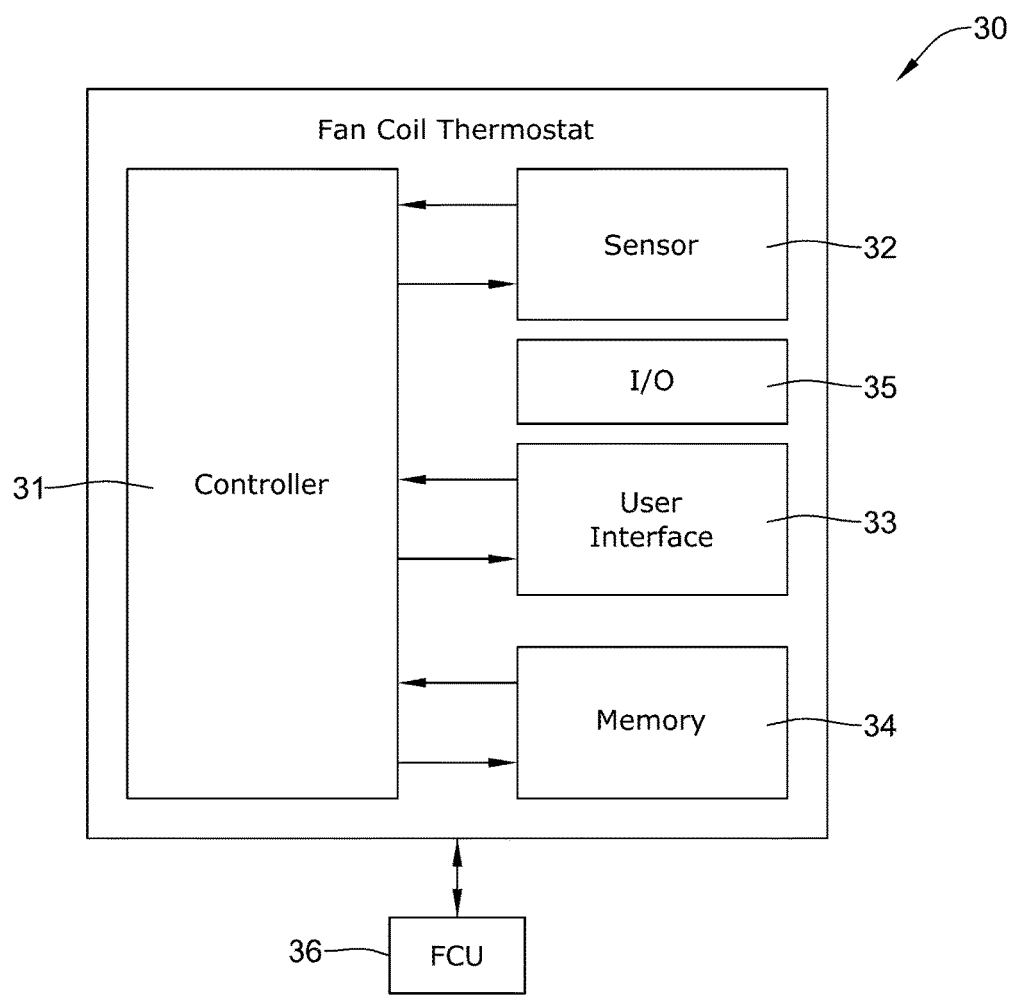
FIG. 2 is a schematic block diagram of an illustrative fan coil unit controller that may be used in conjunction with the fan coil unit of FIG. 1.

FIG. 2 is a schematic block diagram of an illustrative FCU controller that may be used in conjunction with an illustrative FCU 36. The FCU controller may be embodied in a fan coil thermostat 30. The illustrative fan coil thermostat 30 may be an example of the fan coil thermostat 21 shown in FIG. 1. The illustrative fan coil thermostat 30 includes a controller 31, a sensor 32, a user interface 33, an input/output (I/O) 35, and a memory 34. It is contemplated that the input/output 35 may include a wired and/or wireless interface, as desired. The fan coil thermostat 30 may be mounted on a wall in a space in the building, but this is not required.

The controller 31 of the fan coil thermostat 30 may be configured to control the comfort level (e.g., heating, cooling) of a corresponding building space. In some cases, the controller 31 may include a plurality of control modes, which may include a cooling control mode and a heating control mode. In some cases, the controller 31 may include an occupied mode and an unoccupied mode, which will be discussed further with reference to FIG. 4. In some instances, the controller 31 may include a processor, microcontroller, and/or some other controller, which can be programmed to perform certain functions. It is contemplated that the controller 31 may be configured to control and/or set one or more HVAC functions, such as, for example, HVAC schedules, temperature set-points, temperature switch-points, timers, environment sensing, HVAC controller programs, user preferences, and/or other HVAC functions or programs as desired. In some illustrative embodiments, the controller 31 may be programmed to control the comfort level of at least a portion of the building using a temperature sensed by one or more local and/or remote sensors 32.

The controller 31 of the fan coil thermostat 30 may be configured to implement a control algorithm that may be adapted to at least partially control one or more components of the FCU 20. In some cases, the algorithm may include reference a number of operating parameters. In some cases, the controller 31 may include or implement control logic. Examples of components that may be controlled by the controller 31 may include one or more of the fan 22 and the flow control valve 26 of the illustrative FCU 20 of FIG. 1. In some cases, the controller 31 may operate in accordance with a control logic that references an HVAC schedule with temperature set-points, temperature switch-points, starting and/or ending times, and/or the like.

In some cases, the control algorithm (e.g., the control logic) may determine fan speed of the fan 22 based at least in part on if the flow control valve 26 (FIG. 2) is open or closed and/or how far the flow control valve 26 is open. In some cases, the control algorithm may dictate that the fan 22 is off if flow control valve 26 is fully closed. As flow control valve 26 opens, the control algorithm may dictate that fan 22 is running at, for example, a low speed, a medium speed, a high speed, or the like. In some cases, the control algorithm may determine a fan speed of the fan 22 based at least in part on a temperature differential between a current sensed temperature in the building space and a current temperature set-point, and/or a current sensed humidity and a current humidity set-point. The controller 31 may be operatively coupled to input/output (I/O) 35. The output of the I/O 35 may be configured to provide control signals that control the valve 26 and the fan 22 of the illustrative FCU 20 of FIG. 1.

In some cases, the controller 31 may be configured to provide an output via the output of the I/O 35 for opening the valve 26, and activating the fan 22 of the FCU 20 for at least a set period of time from time to time. In some cases, the set period of time may include five minutes, ten minutes, twenty minutes, thirty minutes, or any other suitable period of time. In some cases, from time to time may include once every six months, once every three months, once every four months, or any other suitable time period. In other cases, from time to time may include a time it is determined that the space of the building is occupied.

The controller 31 may be configured to monitor a temperature of the space via the sensor 32 (e.g., temperature sensor) during the set period of time, and determine whether the temperature in the space of the building is increasing or decreasing. When the space temperature is determined to be increasing, the controller 31 determines that the building is in a building heating mode and sets the controller 31 to a heating control mode. When the space temperature is determined to be decreasing, the controller 31 determines that the building is in a building cooling mode and sets the controller 31 to a cooling control mode.

When the controller 31 is in the heating control mode, the controller 31 may compare the space temperature to a heating temperature setpoint, and may open the flow control valve 26 when the space temperature is below the heating temperature setpoint to raise the space temperature toward the heating temperature setpoint. When the controller 31 is in the cooling control mode, the controller 31 may compare the space temperature to a cooling temperature setpoint, and open the flow control valve 26 when the space temperature is above the cooling temperature setpoint to lower the space temperature toward the cooling temperature setpoint.

The memory 34 may be used to store any desired information, such as the aforementioned HVAC schedules, temperature set-points, temperature switch-points, timers, environmental settings, and/or any other settings and/or information as desired. In some cases, the memory 34 may be used, for example, to store one or more unoccupied temperature set-points, and/or programming that instructs the controller 31 how to regulate the valve 26 and/or the fan 22 in order to obtain and maintain a particular temperature set-point. Memory 34 may include any suitable type of memory, such as, for example, random-access memory (RAM), read-only memory (ROM), electrically erasable programmable read-only memory (EEPROM), Flash memory, or any other suitable memory as desired. The controller 31 may store information, such as a plurality of parameters, within the memory 34, and may subsequently retrieve the stored information from the memory 34.

The user interface 33 may be any suitable interface that operatively coupled to the controller 31 and configured to display and/or solicit information as well as permit a user to enter data and/or other parameters and/or settings such as temperature set-points, temperature switch-points, starting times, ending times, and/or the like, as desired. In some cases, the user interface 33 of the fan coil thermostat 30 may allow a user (e.g., owner, technician, or other person) to program and/or modify one or more control parameters of the fan coil thermostat 30, such as programming temperature set-points, temperature switch-points, temperature differentials or offsets, start and stop times, equipment status and/or other parameters as desired. In some instances, the user interface 33 may include a touch screen, a liquid crystal display (LCD) panel and keypad, a dot matrix display, one or more buttons, a computer, a tablet, a mobile phone and/or other suitable user interface, as desired.

The controller 31 may be adapted to provide to and/or receive information from the user interface 33. The controller 31 may, for example, display a current temperature and/or a current temperature set-point on a display (not shown). Other examples of information that may be provided by the controller 31 may include a current fan speed, a current fan mode, equipment status (on/off), a current time, a current control mode (e.g. heating control mode or cooling control mode), and/or any other suitable information as desired. Examples of information that may be received may include changes in a temperature set-point, changes in fan speed, and the like.

In some cases, the fan coil thermostat 30 may be operatively coupled to one or more sensors, such as a temperature sensor, a humidity sensor, a ventilation sensor, an air quality sensor, a door open sensor, an occupancy and/or any other suitable building control sensor as desired. In some cases, a sensor 32 may be contained within a housing of the fan coil thermostat 30 itself. In other cases, the sensor 32 may be separate from the fan coil thermostat 30. In some cases, the fan coil thermostat 30 may include a data port configured to communicate with the controller 31 and may, if desired, be used to either upload information to the controller 31 or download information from the controller 31. Information that can be uploaded or downloaded may include values of operating parameters, settings, firmware, and/or any other suitable information, as desired.

Figure 3:
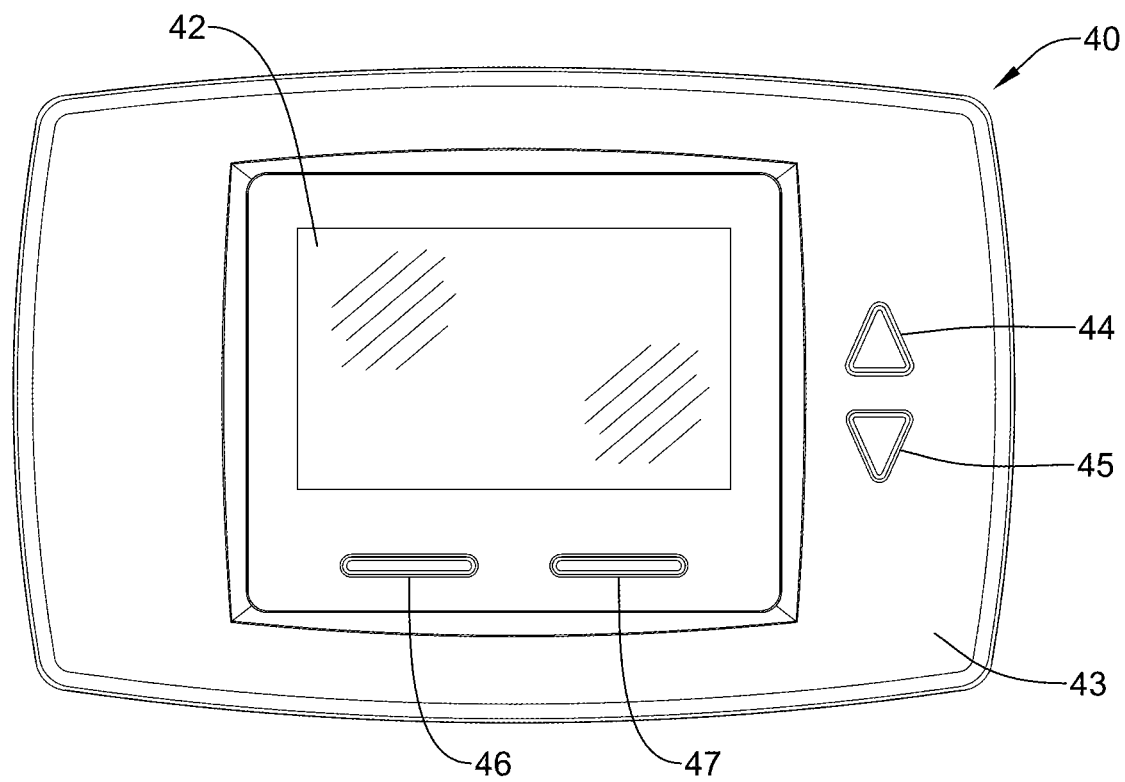
FIG. 3 is a front perspective view of an illustrative fan coil thermostat that may embody the fan coil unit controller of FIG. 2.

FIG. 3 is a front perspective view of an illustrative fan coil thermostat 40. The fan coil thermostat 40 may be considered as an embodiment or perhaps as a particular example of the fan coil thermostat 21 of FIG. 1 and/or fan coil thermostat 30 of FIG. 2. The illustrative fan coil thermostat 40 includes a display 42 that is housed by the housing 43. In some cases, the display 42 may be at least a portion of the user interface 33 of the fan coil thermostat 30. The display 42 may be a touch screen display, a liquid crystal display (LCD) panel, a dot matrix display, a fixed segment display, a cathode rat tube (CRT), or any other suitable display, as desired. A dot matrix display is typically an LCD display that permits images such as letters, numbers, graphics, and the like to be displayed anywhere on the LCD, rather than being confined to predetermined locations such as is the case with a fixed segment LCD. The housing 43 may be formed of any suitable material, such as polymeric, metallic, or any other material as desired. In some cases, the display 42 may be either inset or recessed within the housing 43 as shown, but still accessible to the user. In some cases, the fan coil thermostat 40 may be configured to provide a substantial display and/or programming functionality, but this is not required in all embodiments.

The illustrative fan coil thermostat 40 includes several buttons. As illustrated, the fan coil thermostat 40 includes a fan speed up button 44 and a fan speed down button 45. In some cases, it is contemplated that the fan coil thermostat 40 may include a single fan speed button that can be pressed repeatedly to step through the available fan speed settings. In some instances, a slider button or even a rotary dial may be provided to select a fan speed setting. The illustrative fan coil thermostat 40 also includes a temperature up button 46 and a temperature down button 47. A user may select and/or alter a temperature setting by pressing the temperature up button 46 and/or the temperature down button 47, as appropriate. The buttons 44, 45, 46, and 47 illustrated are not to be considered as limiting in any way, but are merely provided to show examples of buttons that may be included if desired. It will be appreciated that the fan coil thermostat 40 may include no buttons, one button, two buttons, ten buttons, a keypad, or any suitable number of buttons, as desired. It is contemplated that the fan coil thermostat 40 may have a touch screen LCD that provides the functionality of the display 42 as well as the fan speed up button 44, the fan speed down button 45, the temperature up button 46 and the temperature down button 47. In some cases, the various buttons may be provided as touch regions on the touch screen display.

Figure 4:
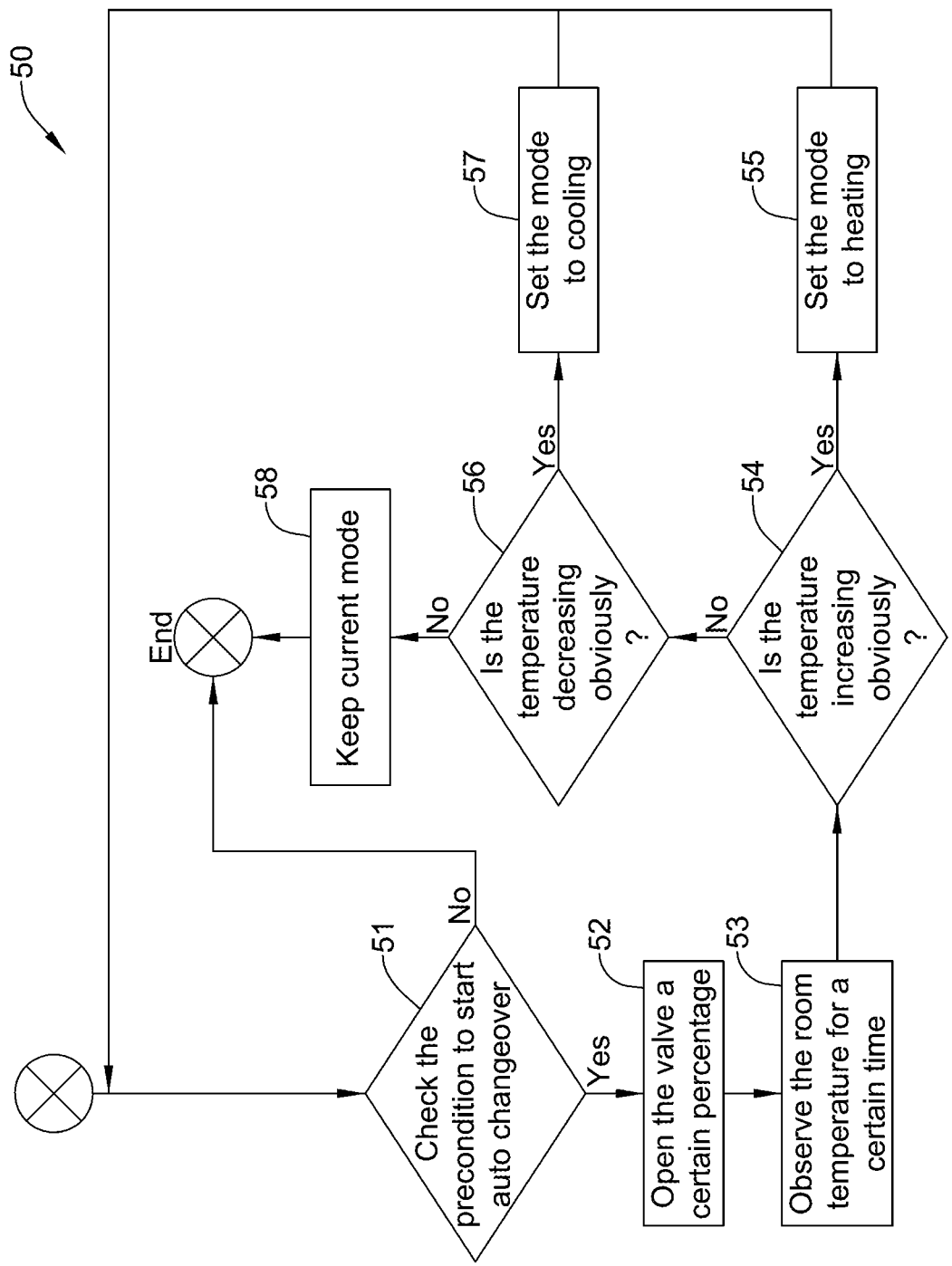
FIG. 4 is a flow diagram of an illustrative method of operating a fan coil unit.
Figure 5:
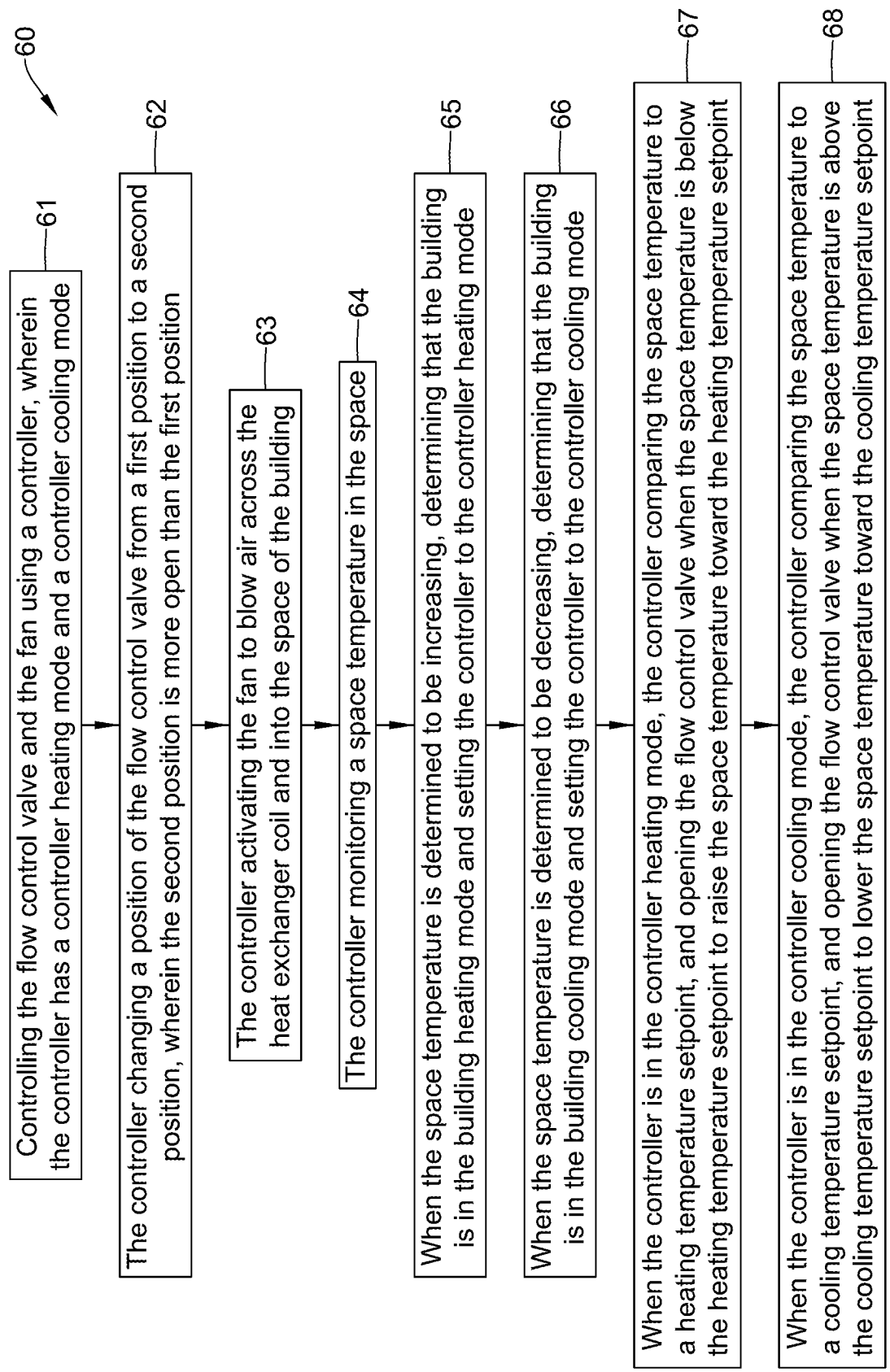
FIG. 5 is a flow diagram of an illustrative method of operating a fan coil unit.

FIGS. 4 and 5 are flow diagrams of illustrative methods of operating a fan coil unit (FCU) that is configured to control a temperature within a space of a building. The FCU may or may not be the FCU described in FIG. 1. The task of employing this method may be carried out by a controller, such as the fan coil thermostat 30 of FIG. 2.

As previously discussed, the FCU may include a heat exchanger coil (e.g., the fan coil 23) that may receive a supply fluid from a supply pipe and returns a return fluid to a return pipe. The FCU may further include a fan for blowing air across the heat exchanger coil and into the space of the building. The flow of supply fluid through the heat exchanger coil may be controlled by a flow control valve (e.g., the valve 26). The supply fluid may be heated when the building is in a building heating mode, and the supply fluid may be cooled when the building is in a building cooling mode. The FCU may include a controller (e.g., the fan coil thermostat 30), and the controller may include an auto-changeover validation mode and an operational mode.

As shown in FIG. 4, an illustrative method 50 may begin by checking a precondition to enter an auto-changeover validation mode, as referenced by block 51. In some cases, the controller may include a timer which may be set to run control logic periodically, such as, for example, once every six months, once every three months, once every four months, and or any other suitable time. In some cases, the control logic may include a schedule that determines when the controller checks the precondition to determine whether or not to enter the auto-changeover validation mode. In some cases, checking the precondition may include determining an occupancy of the space in the building. If the space is occupied, the precondition is considered not to be met. The occupancy of the space in the building may be determined via an occupancy sensor (e.g., a passive infrared (PIR) sensor), a card reader, or any other suitable means.

In some cases, the space in the building may be determined to be unoccupied. When the building is determined to be unoccupied, the controller may enter an unoccupied mode. In one example, when the controller is in the unoccupied mode, the controller may enter the auto-changeover validation mode. When the controller is in the auto-changeover validation mode, the controller may open the flow control valve (e.g., valve 26) of the FCU of the controlled space by a predetermined percentage, which may include opening the valve from a first position to a second position, wherein the second position is more open than the first position, as referenced by block 52. In some cases, the first position may be a fully closed position, and the second position may be open ten percent, twenty percent, seventy-five percent, fully open, or any suitable position, as desired. In another example, the first position may be open ten percent, and the second position may be open twelve percent, twenty percent, seventy-five percent, one hundred percent, or any suitable position, as desired. When the valve is in the second position, the controller may monitor a space temperature in the space of the building for a predetermined length of time, as referenced by block 53. The predetermined length of time may be one minute, two minutes, five minutes, twenty minutes, sixty minutes, or any other suitable length of time, as desired. The controller monitors the space temperature for the predetermined length of time to determine if the temperature of the space inside the building has increased or decreased by at least a threshold amount. In some examples, the threshold amount may include one-degree Fahrenheit (F), two degrees F., five degrees F., or any other suitable amount. The controller can, for example, determine the temperature of the space through the use of a temperature sensor (e.g., sensor 32).

If the controller determines that the temperature is increasing or has increased by at least a threshold amount over the predetermined length of time, as referenced by block 54, the controller determines that the building is in a building heating mode, and sets the controller to a heating control mode, as referenced by block 55. Similarly, if the controller determines that the temperature is decreasing by at least a threshold amount over the predetermined length of time, as referenced by block 56, the controller determines that the building is in the building cooling mode, and sets the controller to a cooling control mode, as referenced by block 57.

In some cases, the space in the building may be determined to be occupied. When the building is determined to be occupied, the controller enters the occupied mode. In such cases, the controller does not enter the auto-changeover validation mode and maintains the current mode (e.g., the heating control mode or the cooling control mode).

FIG. 5 is a flow diagram of an illustrative method 60 of operating a FCU that is configured to control a temperature within a space of a building. The method 60 includes controlling the flow control valve and the fan using a controller (e.g., the controller 31), wherein the controller includes a heating control mode and a cooling control mode, as referenced by block 61. The controller may enter an auto-changeover validation mode. The controller may enter the auto-changeover validation mode periodically, such as, for example, once every six months, once every three months, once every four months, every week and/or any other suitable time. In some cases, the controller may enter the auto-changeover validation mode from time to time, such as, for example, when the space of the building has been determined to be unoccupied (e.g., via an occupancy sensor).

When in the auto-changeover validation mode, the controller may change the position of the flow control valve from a first position to a second position, wherein the second position is more open than the first position, as referenced by block 62. The controller may activate the fan to blow air across the heat exchanger coil, and into the space of the building, as referenced by block 63. The controller may monitor a space temperature in the space of the building, as referenced by block 64. In some cases, when the space temperature is determined to be increasing, the controller may determine that the building is in a heating mode, and may set the controller to a heating control mode, as referenced by block 65. In some cases, when the space temperature is determined to be decreasing, the controller may determine that the building is in a building cooling mode, and may set the controller to a cooling control mode, as referenced by block 66.

In some cases, the controller may enter the operational mode. When the controller is in the operational mode, and the controller is in the heating control mode, the controller may compare the space temperature to a heating temperature set-point, and may open the flow control valve when the space temperature is below the heating temperature set-point to raise the space temperature toward the heating temperature set-point, as referenced by block 67. In some cases, when the controller is in the cooling control mode, the controller may compare the space temperature to a cooling temperature set-point, and may open the flow control valve when the space temperature is above the cooling temperature set-point to lower the space temperature toward the cooling temperature set-point, as referenced by block 68.

In some cases, the FCU controller has an occupied mode and an unoccupied mode. In the occupied mode, the FCU controller maintains the space in accordance with a comfort temperature setpoint, and in the unoccupied mode, the FCU controller maintains the space in an energy saving setpoint. When switching between the unoccupied mode and the occupied mode, the FCU controller must typically activate the FCU to drive the space temperature from the energy saving set point to the comfort setpoint. It is contemplated that the controller may perform an auto changeover validation while the FCU is activated and attempting to drive the space temperature from the energy saving set point to the comfort setpoint. If the FCU controller is expecting to warm the space from the energy saving set point to the comfort setpoint, but the sensed space temperature is actually cooling during this time period, the FCU controller may conclude that the building has switched from the building heating mode to the building cooling mode, and the FCU may change from a heating control mode to a cooling control mode. Conversely, if the FCU controller is expecting to cool the space from the energy saving set point to the comfort setpoint, but the sensed space temperature is actually heating during this time period, the FCU controller may conclude that the building has switched from the building cooling mode to the building heating mode, and the FCU may change from a cooling control mode to a heating control mode.

Figure 6A:
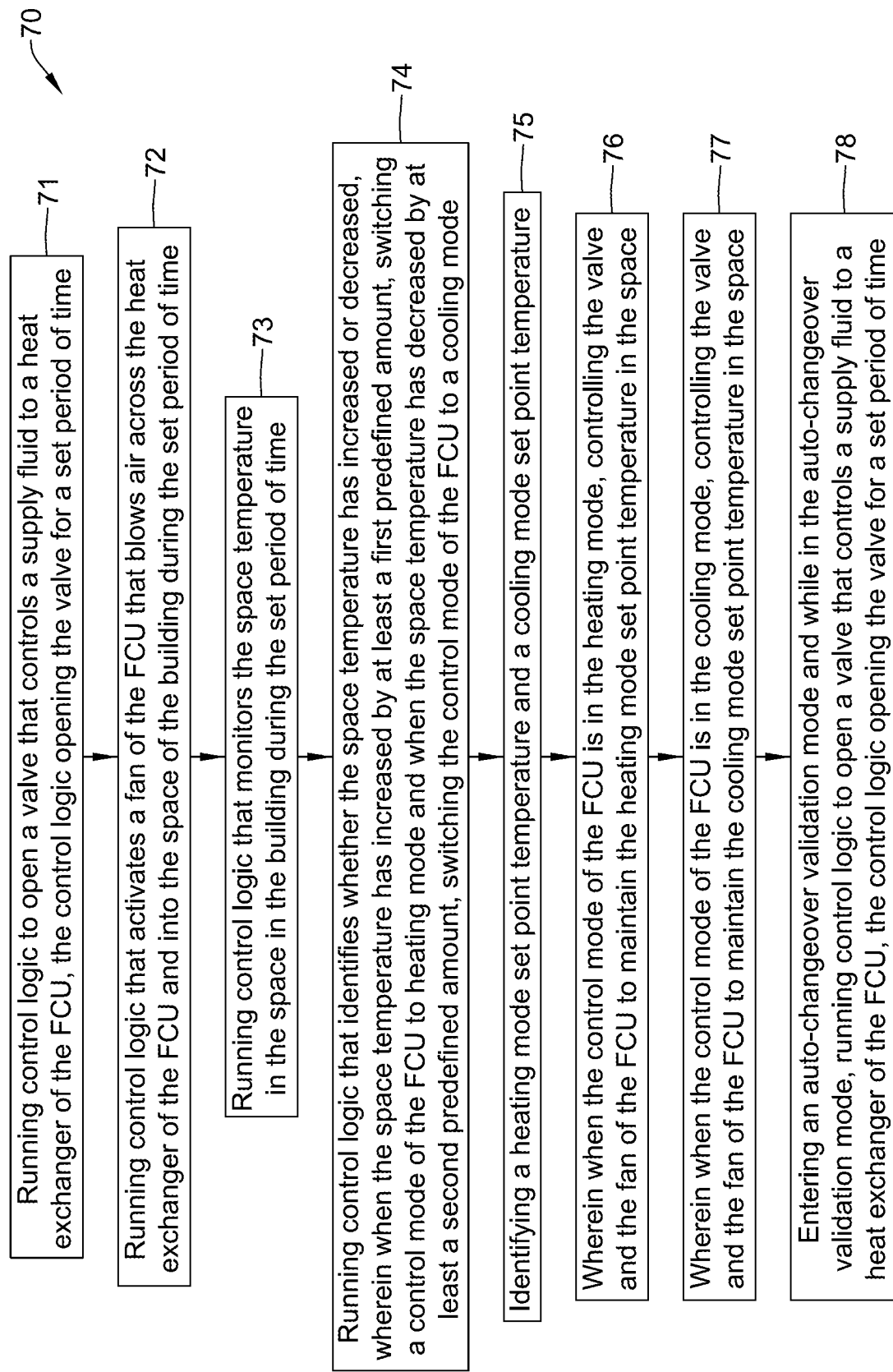
FIGS. 6A-6B show a flow diagram of an illustrative method of operating a fan coil unit.
Figure 6B:
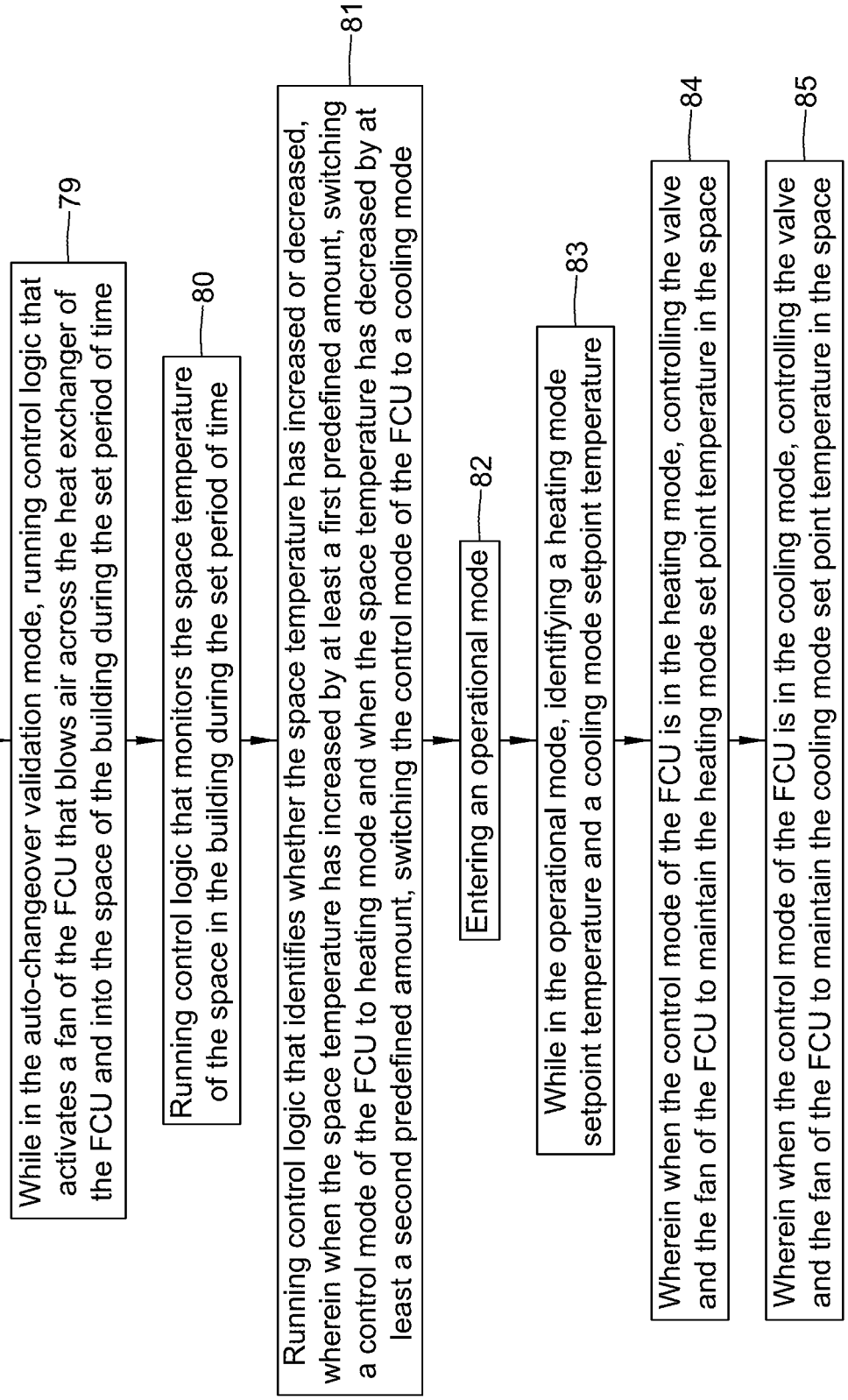

FIGS. 6A-6B are flow diagrams of an illustrative method 70 of operating a FCU that is configured to control a temperature within a space of a building. As shown in FIG. 6A, the method 70 may include running control logic to open a valve (e.g., valve 26) that controls a fluid supply to a heat exchanger (e.g., fan coil 23) of the FCU, wherein the control logic may open the valve for a set period of time, as referenced by block 71. The set period of time may include one minute, two minutes, five minutes, twenty minutes, sixty minutes, or any other suitable period of time, as desired. The method 70 may further include running control logic that activates a fan of the FCU that blows air across the heat exchanger of the FCU and into the space of the building during the set period of time, as referenced by block 72. Control logic may be run that monitors the space temperature in the building during the set period of time, as referenced by block 73, and identifies whether the space temperature has increased or decreased. When the space temperature has increase by at least a first predefined amount, the control logic may switch a control mode of the FCU to a heating mode, and when the space temperature has decreased by at least a second predefined amount, the control logic may switch the control mode of the FCU to a cooling mode, as referenced by block 74. In some cases, the first predefined amount may be one-degree Fahrenheit (F), two degrees F., five degrees F., or any other suitable amount, as desired. In some cases, the second predefined amount may be one-degree F., two degrees F., five degrees F., or any other suitable amount, as desired.

The method 70 may include identifying a heating mode set-point temperature and a cooling mode set-point temperature, as referenced at block 75. When the control mode of the FCU is in the heating mode, the method 70 may include controlling the valve and the fan of the FCU to maintain the heating mode set-point temperature in the space, as referenced by block 76. When the control mode of the FCU is in the cooling mode, the method 70 may include controlling the valve and the fan of the FCU to maintain the cooling mode set-point temperature in the space, as referenced by block 77.

In some cases, the method 70 may include subsequently entering an auto-changeover validation mode. While in the auto-changeover validation mode, control logic may be run to open a valve that controls a supply fluid to a heat exchanger of the FCU. The control logic may open the valve for a set period of time, as referenced by block 78. As shown in FIG. 6B, while in the auto-changeover validation mode, the control logic may activate a fan of the FCU that blows air across the heat exchanger of the FCU, and into the space of the building during the set period of time, as referenced by block 79. The method 70 may further include running control logic that monitors the space temperature in the space in the building during the set period of time, as referenced by block 80, and running control logic that identifies whether the space temperature has increased or decreased. When the space temperature has increased by at least a first predefined amount, switching a control mode of the FCU to a heating mode, and when the space temperature has decreased by at least a second predefined amount, switching the control mode of the FCU to a cooling mode, as referenced by block 81.

In some cases, the method 70 may include entering an operational mode, as referenced by block 82. While in the operational mode, the method may include identifying a heating mode set-point temperature and a cooling mode set-point temperature, as referenced by block 83. When the control mode of the FCU is in the heating mode, controlling the valve and the fan of the FCU to maintain the heating mode set-point temperature in the space, as referenced by block 84. When the control mode of the FCU is in the cooling mode, controlling the valve and the fan of the FCU to maintain the cooling mode set-point temperature in the space, as referenced by block 85.

Figure 7:
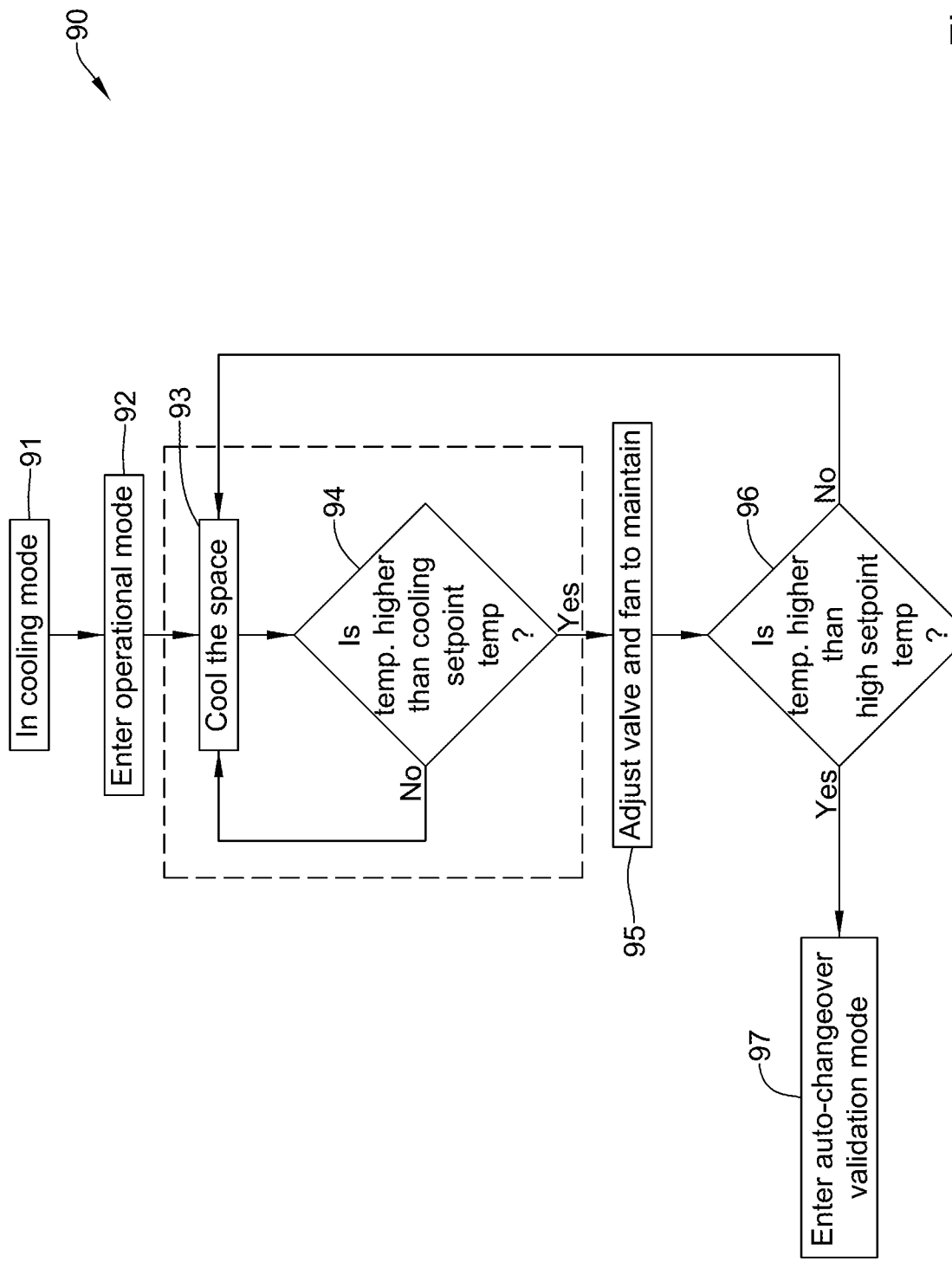
FIG. 7 is a flow diagram of an illustrative method of operating a fan coil unit.
Figure 8:
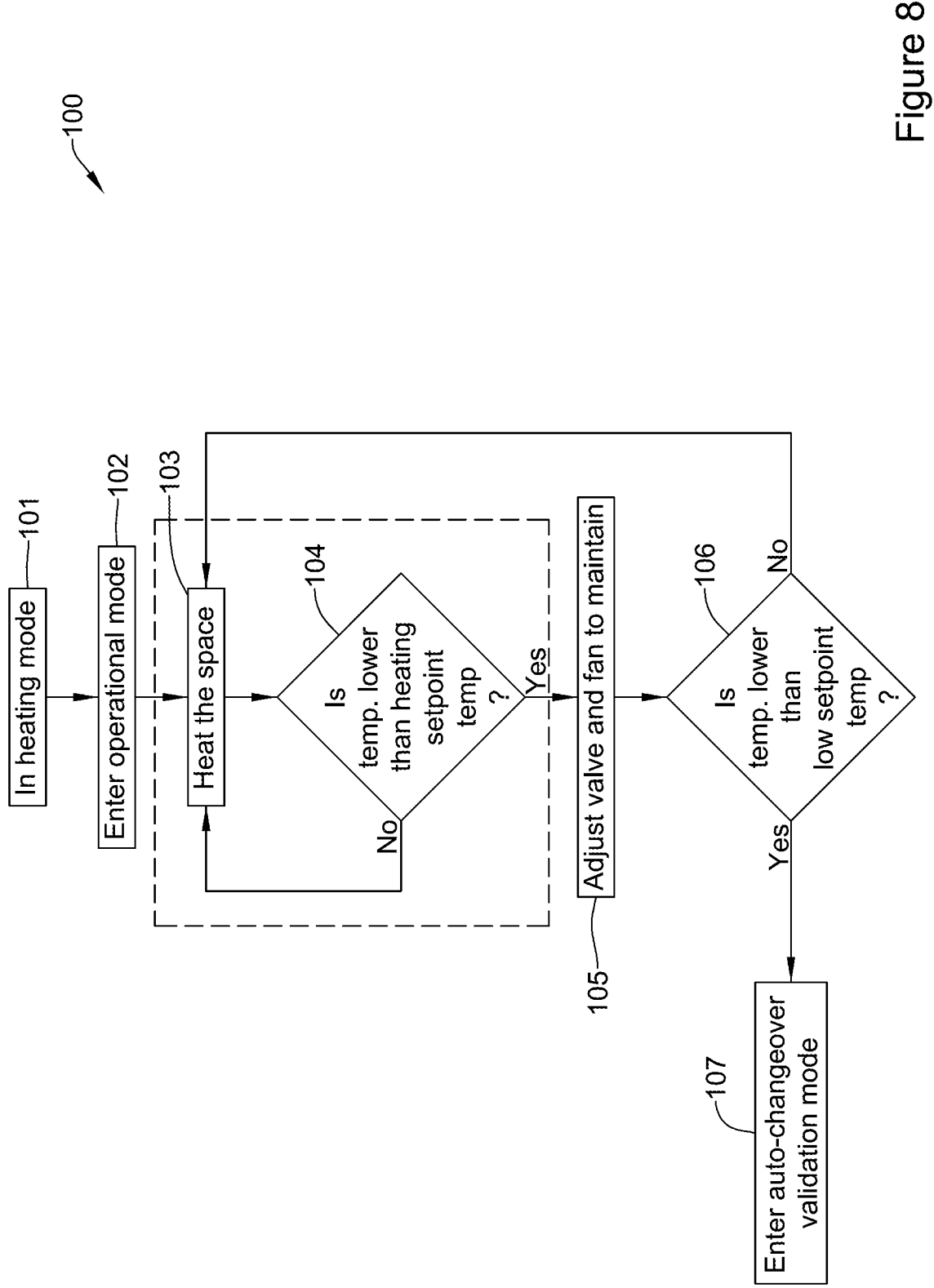
FIG. 8 is a flow diagram of an illustrative method of operating a fan coil unit.

FIGS. 7 and 8 are flow diagrams of illustrative methods of operating an FCU that is configured to control a temperature within a space of a building. As discussed with reference to FIGS. 4-6B, the fan coil unit (FCU) may include an auto-changeover validation mode and an operational mode. The FCU may include a controller (e.g., fan coil thermostat 21) that may include a timer configured to run control logic which, during the auto-changeover validation mode, may be configured to open a flow control valve from a first position to a second position, wherein the second position is more open than the first position. For example, the first position of the flow control valve may be wherein the flow control valve is open ten percent and the second position may be wherein the flow control valve is open fifty percent. The controller may monitor the space temperature of the space of the building to determine if the space temperature is increasing or decreasing. If the controller determines that the temperature is increasing, the controller may change to a heating control mode, and if the controller determines that the temperature is decreasing, the controller may be configured to change to a cooling control mode. Upon switching to the heating control mode or the cooling control mode, the controller may enter the operational mode.

FIG. 7 is a flow diagram of a method 90 in which the controller is in the cooling control mode, as referenced by block 91. The controller may enter the operational mode, as referenced by block 92. When the controller is in the operational mode and the cooling mode, the controller may be configured to cool the space of the building, as referenced by block 93. While not explicitly shown in FIG. 7, the controller may be configured to automatically identify the value of a cooling temperature set-point. The cooling temperature set-point may be stored in the memory (e.g., memory 34) of the controller. In some cases, a user may define the value of the cooling temperature set-point. For example, the user may utilize a user interface (e.g., user interface 33) to program the value of the cooling temperature set-point into the controller. In some cases, the cooling temperature set-point may be set to a default factory setting.

In some cases, the controller may be configured to automatically identify a high set-point temperature based on the cooling temperature set-point. In determining the values, the controller may employ an algorithm to calculate the values, such as +/−4 degrees F. above the temperature set-point. In some cases, the user may define the high set-point temperature.

The controller may monitor the space temperature of the space via a temperature sensor, and compare the space temperature to a cooling temperature set-point. At decision block 94, the controller determines if the space temperature is higher than the cooling temperature set-point. If the space temperature is higher than the cooling temperature set-point, then the controller is configured to open the flow control valve to lower the space temperature toward the cooling temperature set-point. If the space temperature is at or below the cooling temperature set-point, then the controller is configured to adjust the valve and the fan to maintain the cooling temperature set-point, as referenced by block 95.

In some cases, when the controller is in the operational mode and in the cooling mode, the controller may monitor the space temperature and determine that the space temperature is higher than the cooling temperature set-point for a predetermined time period or higher than the high set-point temperature, as shown at block 96. In such cases, the controller may enter the auto-changeover validation mode as shown at block 97, and if appropriate, enter the heating control mode.

FIG. 8 is a flow diagram of a method 100 in which the controller is in the heating control mode, as referenced by block 101. The controller may enter the operational mode, as referenced by block 102. When the controller is in the operational mode and the heating mode, the controller may be configured to heat the space of the building, as referenced by block 103. While not explicitly shown in FIG. 8, the controller may be configured to automatically identify the value of a heating temperature set-point. The heating temperature set-point may be stored in the memory (e.g., memory 34) of the controller. In some cases, a user may define the value of the heating temperature set-point. For example, the user may utilize a user interface (e.g., user interface 33) to program the value of the heating temperature set-point into the controller. In some cases, the heating temperature set-point may be set to a default factory setting. In some cases, the controller may be configured to automatically identify a high set-point temperature and a low set-point temperature based on the heating temperature set-point. In determining the values, the controller may employ an algorithm to calculate the values, such as +/−4 degrees F. above the temperature set-point. In some cases, the user may define the high set-point temperature.

The controller may monitor the space temperature of the space via a temperature sensor, and compare the space temperature to a heating temperature set-point. At decision block 104, the controller determines if the space temperature is lower than the heating temperature set-point. If the space temperature is lower than the heating temperature set-point, then the controller is configured to open the flow control valve to raise the space temperature toward the heating temperature set-point. If the space temperature is at or above the heating temperature set-point, then the controller is configured to adjust the valve and the fan to maintain the heating temperature set-point, as referenced by block 105.

In some cases, when the controller is in the operational mode and in the heating mode, the controller may monitor the space temperature and determine that the space temperature is lower than the heating temperature set-point for a predetermined time period or lower than the low set-point temperature, as shown at block 106. In such cases, the controller may enter the auto-changeover validation mode as shown at block 107, and if appropriate, enter the cooling control mode.

All numbers are herein assumed to be modified by the term "about", unless the content clearly dictates otherwise. The recitation of numerical ranged by endpoints includes all numbers subsumed within that range (e.g., 1 to 5 includes, 1, 1.5, 2, 2.75, 3, 3.8, 4, and 5).

As used in this specification and the appended claims, the singular forms "a", "an", and "the" include the plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is contemplated that the feature, structure, or characteristic may be applied to other embodiments whether or not explicitly described unless clearly stated to the contrary.

Having thus described several illustrative embodiments of the present disclosure, those of skill in the art will readily appreciate that yet other embodiments may be made and used within the scope of the claims hereto attached. It will be understood, however, that this disclosure is, in many respects, only illustrative. Changes may be made in details, particularly in matters of shape, size, arrangement of parts, and exclusion and order of steps, without exceeding the scope of the disclosure. The disclosure's scope is, of course, defined in the language in which the appended claims are expressed.

What is claimed is:

1. A method of operating a two-pipe fan coil unit (FCU) that is configured to control a temperature within a space of a building, the FCU having a heat exchanger coil that receives a supply fluid from a supply pipe and returns a return fluid to a return pipe, the FCU further having a fan for blowing air across the heat exchanger coil and into the space of the building, a flow of supply fluid through the heat exchanger coil is controlled by a flow control valve, the supply fluid is heated when the building is in a building heating mode and the supply fluid is cooled when the building is in a building cooling mode, the method comprising:

controlling the flow control valve and the fan using a controller, wherein the controller has a heating control mode and a cooling control mode;

the controller changing a position of the flow control valve from a first position to a second position, wherein the second position is more open than the first position;

the controller activating the fan to blow air across the heat exchanger coil and into the space of the building;

the controller monitoring a space temperature in the space;

the controller determining that the space temperature is increasing, and, in response, the controller determining that the building is in the building heating mode and setting the controller to the heating control mode; and after setting the controller in the heating control mode, the controller comparing the space temperature to a heating temperature set-point, and opening the flow control valve when the space temperature is below the heating temperature set-point to raise the space temperature toward the heating temperature set-point.

2. The method of claim 1, further comprising the controller entering an auto-changeover validation mode, and once in the auto-changeover validation mode:

the controller changing a position of the flow control valve from a first position to a second position, wherein the second position is more open than the first position;

the controller activating the fan to blow air across the heat exchanger coil and into the space of the building;

the controller monitoring a space temperature in the space;

the controller determining the space temperature is decreasing, and, in response, the controller determining that the building is in the building cooling mode and setting the controller to the cooling control mode.

3. The method of claim 2, further comprising the controller entering an operational mode, and once in the operational mode:

after setting the controller in the heating control mode, the controller comparing the space temperature to a heating temperature set-point, and opening the flow control valve when the space temperature is below the heating temperature set-point to raise the space temperature toward the heating temperature set-point.

4. The method of claim 3, wherein the controller enters the auto-changeover validation mode periodically.

5. The method of claim 3, further comprising, after setting the controller in the heating control mode, the controller determining whether opening the flow control valve causes the space temperature to reach the heating temperature setpoint within a first predetermined time period, and if not, entering the auto-changeover validation mode.

6. The method of claim 1, wherein the controller is a thermostat mounted in the space and operatively coupled to a temperature sensor for sensing the space temperature in the space.

7. The method of claim 1, wherein the space temperature is determined to be increasing in response to the space temperature increasing by at least a threshold amount within a predetermined length of time.

8. The method of claim 1, wherein changing the position of the flow control valve comprises opening the flow control valve by a predetermined percentage, and monitoring the space temperature comprises monitoring the space temperature for a predetermined length of time.

9. A thermostat configured for controlling a temperature in a space in a building, the thermostat comprising:

an output for controlling a valve of a fan coil unit (FCU) and a fan of the FCU;

a temperature sensor for sensing a temperature in the space of the building;

a controller operatively coupled to the output and the temperature sensor, the controller having a plurality of control modes including a cooling control mode and a heating control mode, the controller configured to:

provide an output via the output for opening the valve and activating the fan of the FCU for a set period of time;

monitor the temperature of the space via the temperature sensor during the set period of time;

identify whether the temperature in the space of the building is increasing or decreasing;

wherein when the temperature in the space has increased by at least a first predefined amount during the set period of time, set the control mode of the thermostat to the heating control mode;

wherein when the temperature in the space has decreased by at least a second predefined amount during the set period of time, set the control mode of the thermostat to the cooling control mode; and control the FCU in accordance with the set control mode of the thermostat.

10. The thermostat of claim 9, wherein the controller is configured to perform the following from time to time:

provide the output via the output for opening the valve and activating the fan of the FCU for a period of time;

monitor the temperature of the space via the temperature sensor during the set period of time;

identify whether the temperature in the space of the building is increasing or decreasing;

wherein when the temperature in the space has increased by at least a first predefined amount during the set period of time, set the control mode of the thermostat to the heating control mode; and wherein when the temperature in the space has decreased by at least a second predefined amount during the set period of time, set the control mode of the thermostat to the cooling control mode.

11. The thermostat of claim 10, wherein the controller has an occupied mode and an unoccupied mode, wherein the controller is configured to perform the following when the controller is in the unoccupied mode:

provide the output via the output for opening the valve and activating the fan of the FCU for a period of time;

monitor the temperature of the space via the temperature sensor during the set period of time;

identify whether the temperature in the space of the building is increasing or decreasing;

wherein when the temperature in the space has increased by at least a first predefined amount during the set period of time, set the control mode of the thermostat to the heating control mode; and wherein when the temperature in the space has decreased by at least a second predefined amount during the set period of time, set the control mode of the thermostat to the cooling control mode.

12. The thermostat of claim 11, wherein the thermostat comprises an occupancy sensor for sensing occupancy in the space, and when occupancy is detected, the controller is in in the occupied mode and when occupancy is not detected, the controller is in the unoccupied mode.

13. A method of operating a two-pipe fan coil unit (FCU) that is configured to control a temperature within a space of a building, the FCU having a heat exchanger coil that receives a supply fluid from a supply pipe and returns a return fluid to a return pipe, the FCU further having a fan for blowing air across the heat exchanger coil and into the space of the building, a flow of supply fluid through the heat exchanger coil is controlled by a flow control valve, the supply fluid is heated when the building is in a building heating mode and the supply fluid is cooled when the building is in a building cooling mode, the method comprising:

controlling the flow control valve and the fan using a controller, wherein the controller has a heating control mode and a cooling control mode;

the controller changing a position of the flow control valve from a first position to a second position, wherein the second position is more open than the first position;

the controller activating the fan to blow air across the heat exchanger coil and into the space of the building;

the controller monitoring a space temperature in the space;

the controller determining that the space temperature is decreasing, and, in response, the controller determining that the building is in the building cooling mode and setting the controller to the cooling control mode; and when the controller is in the cooling control mode, the controller comparing the space temperature to a cooling temperature set-point, and opening the flow control valve when the space temperature is above the cooling temperature set-point to lower the space temperature toward the cooling temperature set-point.

14. The method of claim 13, further comprising the controller entering an auto-changeover validation mode, and once in the auto-changeover validation mode:

the controller changing a position of the flow control valve from a first position to a second position, wherein the second position is more open than the first position;

the controller activating the fan to blow air across the heat exchanger coil and into the space of the building;

the controller monitoring a space temperature in the space;

the controller determining the space temperature is increasing, and in response, the controller determining that the building is in the building heating mode and setting the controller to the heating control mode.

15. The method of claim 14, further comprising the controller entering an operational mode, and once in the operational mode, after setting the controller in the cooling control mode, the controller comparing the space temperature to a cooling temperature set-point, and opening the flow control valve when the space temperature is above the cooling temperature set-point to lower the space temperature toward the cooling temperature set-point.

16. The method of claim 15, wherein the controller enters the auto-changeover validation mode periodically.

17. The method of claim 15, further comprising, after setting the controller in the cooling control mode, the controller determining whether opening the flow control valve causes the space temperature to reach the cooling temperature setpoint within a second predetermined time period, and if not, entering the auto-changeover validation mode.

18. The method of claim 13, wherein the controller is a thermostat mounted in the space and operatively coupled to a temperature sensor for sensing the space temperature in the space.

19. The method of claim 13, wherein the space temperature is determined to be decreasing when the space temperature decreases by at least a threshold amount within a predetermined length of time.

20. The method of claim 13, wherein changing the position of the flow control valve comprises opening the flow control valve by a predetermined percentage, and monitoring the space temperature comprises monitoring the space temperature for a predetermined length of time.

* * * * *